United States Patent Office

3,567,694
Patented Mar. 2, 1971

3,567,694
POLYESTERS, POLYAMIDES, AND POLYESTER-AMIDES FROM ACRYL- OR METHACRYLIMINO DIACETIC ACID
Donald E. Jefferson, Sykesville, and Nelson S. Marans, Silver Spring, Md., assignors to W. R. Grace & Co., New York, N.Y.
No Drawing. Filed Nov. 18, 1969, Ser. No. 877,856
Int. Cl. C08g 17/10, 20/00, 20/30
U.S. Cl. 260—75
1 Claim

ABSTRACT OF THE DISCLOSURE

A polymer having about 10–10,000 repeating monomeric units per molecule, said units being selected from the group consisting of

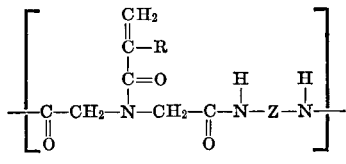

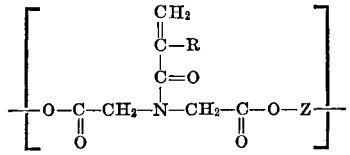

and

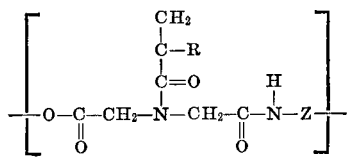

where R is hydrogen or a lower alkyl group and Z is an alkylene group having about 2–12 carbon atoms. This polymer is prepared by a process comprising:
  (a) Forming a mixture of monomers consisting essentially of; (i) a monomeric diester having the formula

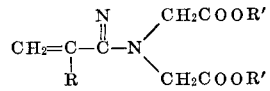

where R is H or lower alkyl and R' is lower alkyl; (ii) a monomer selected from the group of monomers having the formula

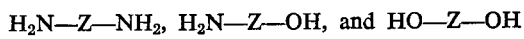

where Z is a lower alkylene group having about 2–12 carbon atoms;
  (b) Heating the mixture of monomers at about 50–150° C. to form the polymer and an alkanol byproduct while removing said alkanol as it is formed; and
  (c) Recovering the polymer.

BACKGROUND OF THE INVENTION

This invention is in the field of polymers. More particularly, it is in the field of polyester, polyamide, and mixed polyester-polyamide polymers. The polymers of this invention can be formed by reacting a monomeric diester having the formula

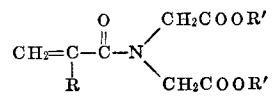

where R is H or lower alkyl and R' is lower alkyl ("lower alkyl" being an alkyl group having about 1–7 carbon atoms) with a compound having the formula

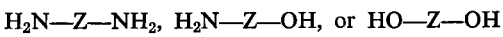

where Z is an alkylene group having about 2–12 carbon atoms.

The polymers of this invention are useful as fibers, elastomers, fabric finishers, dyeable articles, thermoset resins, permanent press agents, and the like. These polymers can be fabricated or applied and then cured, e.g., by ionizing or ultraviolet irradiation or by application of free radical catalysts and heat, to produce crosslinked networks.

SUMMARY OF THE INVENTION

In summary, this invention is directed to a polymer having about 10–10,000 repeating monomeric units per polymer molecule, said units being selected from the group consisting of

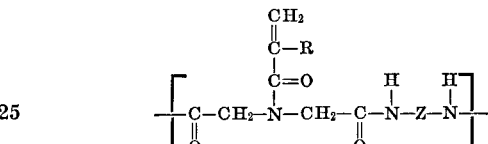

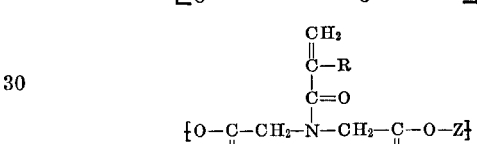

and

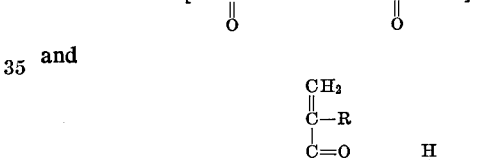

where R is hydrogen or a lower alkyl group and Z is an alkylene group having about 2–12 carbon atoms.

PREFERRED EMBODIMENTS

In a preferred embodiment ("Embodiment A") the polymer of the above summary is prepared by a process comprising:
  (a) Forming a mixture of monomers consisting essentially of; (i) a monomeric diester having the formula

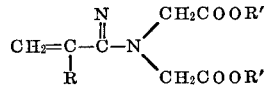

where R is H or lower alkyl and R' is lower alkyl; and (ii) a monomer selected from the group of monomers having the formula

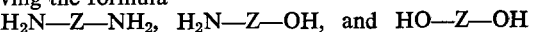

where Z is an alkylene group having about 2–12 carbon atoms;
  (b) Heating the mixture of monomers to about 50–150° C. (preferably to about 75–125° C.) to form the polymer and an alkanol by-product while removing said alkanol as it is formed; and
  (c) Recovering the polymer.

In preferred embodiments of the process of Embodiment A, supra:
  (1) A liquid hydrocarbon boiling within the range of about 80–200° C. (e.g., benzene, toluene, xylene, decahydronapthalene, tetrahydronaphthalene, and the like) is added to the mixture of monomers before heating said mixture, the mole ratio of diester:group member:liquid hydrocarbon being about 1:0.8–2:02–10 (preferably about 1:0.95–1.05:0.5–5);

(2) The diester is

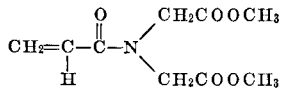

(3) The diester is

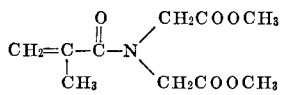

(4) The group member is $H_2N-CH_2CH_2-NH_2$;
(5) The group member is $H_2N-CH_2CH_2-OH$;
(6) The group member is $HO-CH_2CH_2-OH$;
(7) The mixture is heated at about 75–125° C. For about 15–240 minutes;
(8) The mole ratio of monomeric diester to group member in the mixture before polymerization is about 1:0.8–1.2 (preferably about 1:0.95–1.05); and
(9) A polymerization catalyst such as an amine having the formula

where $R_1$, $R_2$, and $R_3$ are lower alkyl groups (i.e, alkyl group having about 1–7 carbon atoms), a metal alkoxide (e.g., lithium, sodium, or potassium methoxide, lithium, sodium, or potassium t-butoxide), metallic salts such as zinc acetate, calcium acetate, a tin chelate, and organotitanates (e.g., tetraethyltitanate, tetraisopropyl titanate, tetraalkyl or mixed aryl alkyl titanates), and the like is added in an effective amount to the mixture of monomers before heating said mixture, the mole ratio of catalyst to diester being about 1:0.0001–0.2 (preferably about 1:0.01–0.1).

The following are typical of groups "end groups" (or "terminal groups") which can occur on the polymers of this invention.

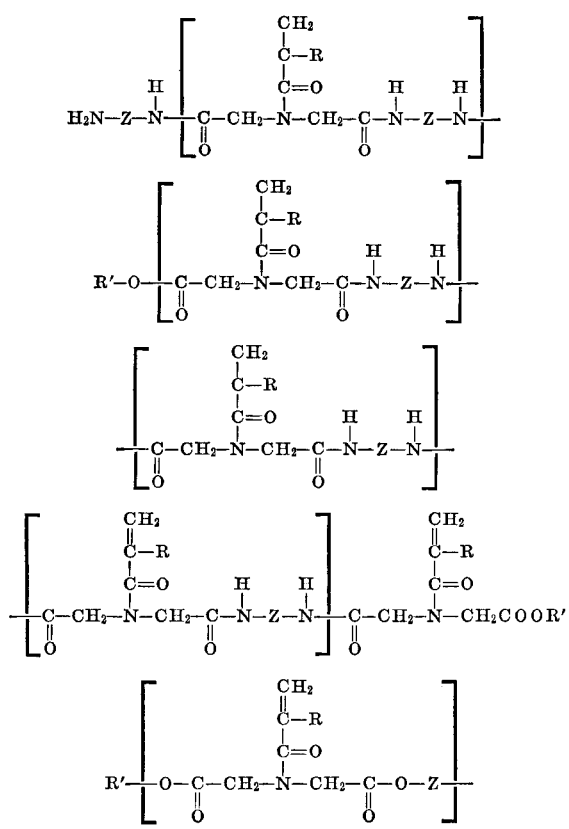

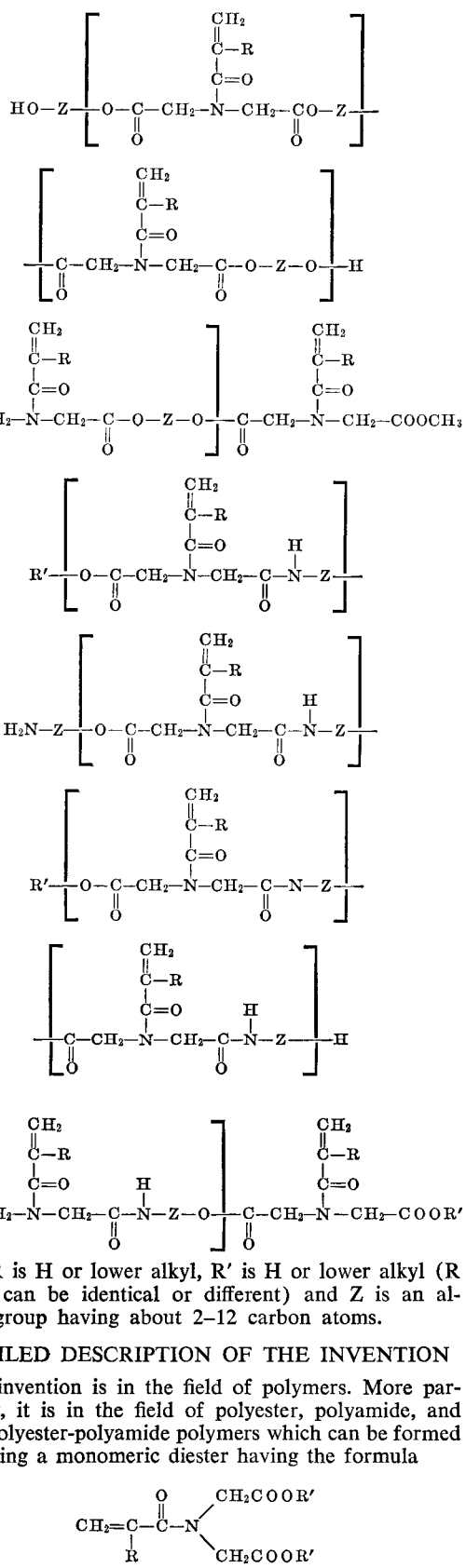

and

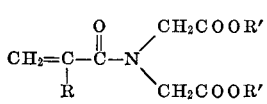

where R is H or lower alkyl, R' is H or lower alkyl (R and R' can be identical or different) and Z is an alkylene group having about 2–12 carbon atoms.

DETAILED DESCRIPTION OF THE INVENTION

This invention is in the field of polymers. More particularly, it is in the field of polyester, polyamide, and mixed polyester-polyamide polymers which can be formed by reacting a monomeric diester having the formula

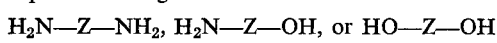

where R is H or lower alkyl and R' is lower alkyl with a compound having the formula $H_2N-Z-NH_2$, $H_2N-Z-OH$, or $HO-Z-OH$ where Z is an alkylene group having about 2–12 carbon atoms.

This invention is further illustrated by the following specific examples.

EXAMPLE I

A solution of 0.25 mole (40.29 grams) of dimethyliminodiacetate in 200 ml. of diethyl ether (ether) was added dropwise to a solution of acrylyl chloride (0.125 mole, 11.31 grams) in 100 ml. of ether. The temperature of said solutions was adjusted to about 0–25° C. and the resulting product mixture was cooled as the dimethyliminodiacetate solution was added dropwise to maintain the temperature of said product mixture within the range of about 10–30° C.

A white crystalline precipitate formed immediately upon the addition of the acrylyl chloride. Said chloride was added over a period of about 30 minutes. The solid by-product (dimethyliminodiacetate hydrochloride) was filtered from the liquid phase of the product mixture, and said filtrate was concentrated under vacuum (i.e., volatile constituents were evaporated therefrom) to yield a solid material which was recovered. The solid material was crystallized from ether using conventional techniques. The crystallized solid (melting point, 60–61° C.) was recovered and analyzed. Said solid (which was labeled "Monomer No. 1") was identified by its infrared spectrum, by NMR (nuclear magnetic resonance), and by functional group analysis as the dimethyl ester of N-acrylyliminodiacetate. Conversion (1 pass yield) based on the weight of the recrystallized material was 56% theory.

Example II

The general procedure of Example I was repeated. However, in this instance the acrylyl chloride was replaced with methacrylyl chloride using 0.125 mole (13.1 grams) in 100 ml. of diethyl ether. Also, in this instance after evaporating the diethyl ether, the residue (crude product) was purified by distilling under vacuum and collecting the fraction boiling between about 117 and 120° C. at 0.75 mm. of mercury absolute pressure. The distilled product (obtained in a conversion of 85% theory and which was labeled "Monomer No. 2") was identified as the dimethyl ester of N-methacrylyliminodiacetic acid by its infrared spectrum and by NMR (nuclear magnetic resonance).

Similar results have been obtained where using ethyl, propyl and other esters of iminodiacetic acid and where using substituted acrylyl halides having the formula

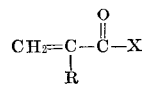

where X is Cl or Br and R is hydrogen, or ethyl, or butyl, or other lower alkyl group.

Example III

A mixture was prepared by admixing 21.5 grams (ca. 0.1 mole) of Monomer No. 1 (described in Example I, supra) and 6.2 grams (ca. 0.1 mole) of ethylene glycol. The resulting mixture was heated in a flask to about 100° C. for about 2 hours while removing by-product methyl alcohol as said alcohol formed.

Then a vacuum (ca. 0.1 mm. of mercury absolute pressure) was applied to the flask in which said resulting mixture had been heated while maintaining the temperature of the flask and its contents at about 95–100° C. for about 15 minutes to remove any unreacted monomer. The vacuum was released, and the flask and its contents were cooled to room temperature (ca. 27° C.).

A solid product weighing 21.6 grams was removed from the flask. This product was identified as a polyester resin consisting of about 150 repeating units per molecule, said units having the formula

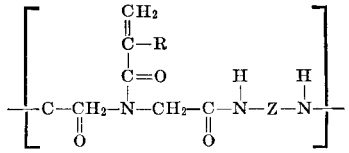

where R is —H and Z was —CH$_2$—CH$_2$—.

Example IV

The general procedure of Example III was repeated. However, in this instance Monomer No. 2 (described in Example II, supra) was substituted for Monomer No. 1 No. 1 decylene glycol (1,10 - dihydroxy - n - decane, H—CH$_2$(CH$_2$)$_8$CH$_2$—OH) was substituted for ethylene glycol using 22.9 grams (ca. 0.1 mole) of Monomer No. 2 and 19.1 grams (ca. 0.11 mole) of the glycol. The mixture was heated at about 130° C. for about 3 hours before applying vacuum.

About 37.0 grams of a solid product polymer consisting of about 100 repeating units per molecule was recovered—said repeating units having the structure recited in Example III; however, in this instance R is —CH$_3$ and Z is —CH$_2$(CH$_2$)$_8$CH$_2$—.

Example V

The general procedure of Example IV was repeated. However, in this instance about 0.1 gram of a polymerization catalyst (sodium ethoxide) was added to the mixture (and admixed therewith) before heating the mixture. The catalyzed mixture was heated at about 75° C. for about 30 minutes. The thus heated mixture was cooled to about 30° C. and washed with three 20 ml. portions of the ordinary "95%" ethyl alcohol of commerce to remove unreacted monomer and catalyst from the product copolymer. The product copolymer was freed of ethyl alcohol by drying at about 30° C. for about 8 hours under reduced pressure (ca. 100 mm. of mercury absolute).

The product polymer, weighing 37.1 grams, was substantially identical to the product polymer of Example IV.

Similar results were obtained in another run where absolute ethyl alcohol was used in place of the above-mentioned "95%" alcohol; similar results were also obtained with methyl alcohol and the propyl alcohols.

Example VI

The general procedure of Example III was repeated. However, in this instance the ethylene glycol was replaced with 6.1 grams (ca. 0.1 mole) of monoethanolamine (H$_2$N—CH$_2$CH$_2$OH).

A product polymer weighing 21.4 grams and consisting of about 200 repeating units having the formula

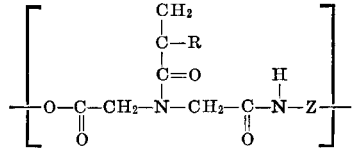

where R is —H and Z is —CH$_2$—CH$_2$— was recovered.

Example VII

The general procedure of Example VI was repeated. However, in this instance the reactants were about 0.1 mole of a diester having the formula

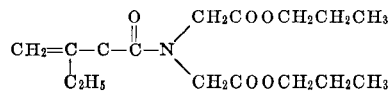

and about 0.09 mole of an amino alcohol having the formula $H_2N-CH_2(CH_2)_5CH_2OH$ These reactors were mixed with about 50 ml. of tetrahydronaphthalene and heated at about 115° C. for about an hour. By-product n-propyl alcohol was removed by evaporation as it formed.

Unreacted monomer and the tetrahydronaphthalene were removed by heating the product to about 120° C. for 15 minutes under reduced pressure (ca. 0.05 mm. of mercury absolute).

The solid product polymer consisted of about 125 repeating units per molecule, said units having the unit formula set forth in Example VI, R being $-CH_2CH_3$ and Z being $-CH_2(CH_2)_5CH_2-$.

Example VIII

The general procedure of Example III was repeated. However, in this instance the ethylene glycol was replaced with 6 grams (ca. 0.1 mole) of ethylenediamine.

The product was a polyamide polymer consisting of about 150 repeating units, said units having the formula

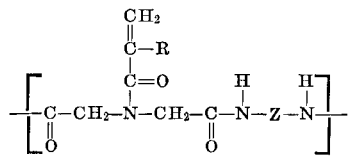

where R is $-H$ and Z is $-CH_2CH_2-$.

Example IX

The general procedure of Example VIII was repeated. However, in this instance Monomer No. 1 was replaced with 22.9 grams (ca. 0.1 mole) of Monomer No. 2, and the ethylenediamine was replaced with 10.4 grams (ca. 0.09) mole of hexamethylenediamine.

A solid product polymer weight 28.0 grams and consisting of about 125 repeating units per molecule, said units having the formula set forth in Example VIII where R is $-CH_3$ and Z is $-CH_2(CH_2)_4CH_2-$.

As used herein the term "mole" has its generally accepted meaning, i.e., that quantity of a substance containing substantially the same number of molecules as there are atoms in 12 grams of pure $^{12}C$.

We claim:
1. A polymer consisting of about 10–10,000 repeating monomeric units per molecule, said units being selected from the group consisting of

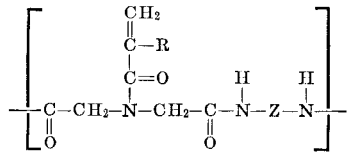

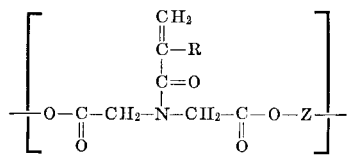

and

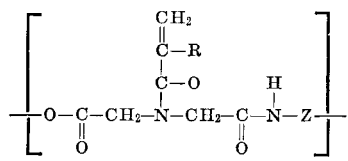

where R is hydrogen or a lower alkyl group and Z is an alkylene group having about 2–12 carbon atoms.

References Cited

UNITED STATES PATENTS

| | | | |
|---|---|---|---|
| 2,925,405 | 2/1960 | Laakso et al. | 260—75 |
| 3,285,886 | 11/1966 | Gunderson et al. | 260—80.3 |
| 3,369,001 | 2/1968 | Marshall | 260—78 |
| 3,507,830 | 4/1970 | Feinaur | 260—47 |

WILLIAM SHORT, Primary Examiner

M. GOLDSTEIN, Assistant Examiner

U.S. Cl. X.R.

260—78, 78.4